(12) United States Patent
Dauss et al.

(10) Patent No.: US 7,254,521 B2
(45) Date of Patent: Aug. 7, 2007

(54) SYSTEM AND METHOD FOR CONDITION-BASED MAINTENANCE

(75) Inventors: Torsten Dauss, Nürnberg (DE); Stefan Deusser, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 150 days.

(21) Appl. No.: 10/523,726

(22) PCT Filed: Jul. 23, 2003

(86) PCT No.: PCT/DE03/02485

§ 371 (c)(1),
(2), (4) Date: Feb. 4, 2005

(87) PCT Pub. No.: WO2004/017235

PCT Pub. Date: Feb. 26, 2004

(65) Prior Publication Data

US 2005/0273184 A1    Dec. 8, 2005

(30) Foreign Application Priority Data

Aug. 5, 2002    (DE) ................................ 102 35 794

(51) Int. Cl.
*G06F 15/00*    (2006.01)
(52) U.S. Cl. .................... 702/184; 340/679; 709/224
(58) Field of Classification Search .................. 702/58, 702/62, 119–124, 130, 141, 182, 183, 184, 702/188, 189; 340/679; 455/423; 709/224
See application file for complete search history.

(56) References Cited

U.S. PATENT DOCUMENTS

| 6,317,701 B1 * | 11/2001 | Pyotsia et al. ............... 702/188 |
| 6,646,564 B1 * | 11/2003 | Azieres et al. ............... 340/679 |
| 2002/0049053 A1 * | 4/2002 | Nomura et al. ............. 455/423 |

FOREIGN PATENT DOCUMENTS

| EP | 0 822 473 A2 | 2/1998 |
| WO | WO 00/62138 A1 | 10/2000 |
| WO | WO 01/31450 A1 | 5/2001 |
| WO | WO 01/59972 A2 | 8/2001 |

* cited by examiner

*Primary Examiner*—John Barlow
*Assistant Examiner*—Mohamed Charioui

(57) ABSTRACT

The invention relates to a system and a method for the condition-based maintenance of at least one decentralised technical installation. The system comprises recording means for recording condition values of the technical installation and transmission means for transmitting the recorded condition values to a central maintenance management system, which comprises first means for evaluating the condition values and second means for generating maintenance orders, depending on the result of the evaluation of the condition values. Said condition-based maintenance is operated, in particular when a global maintenance management system is used, by the transmission of condition values from an automation system via e-mail or HTTP transfer.

18 Claims, 2 Drawing Sheets

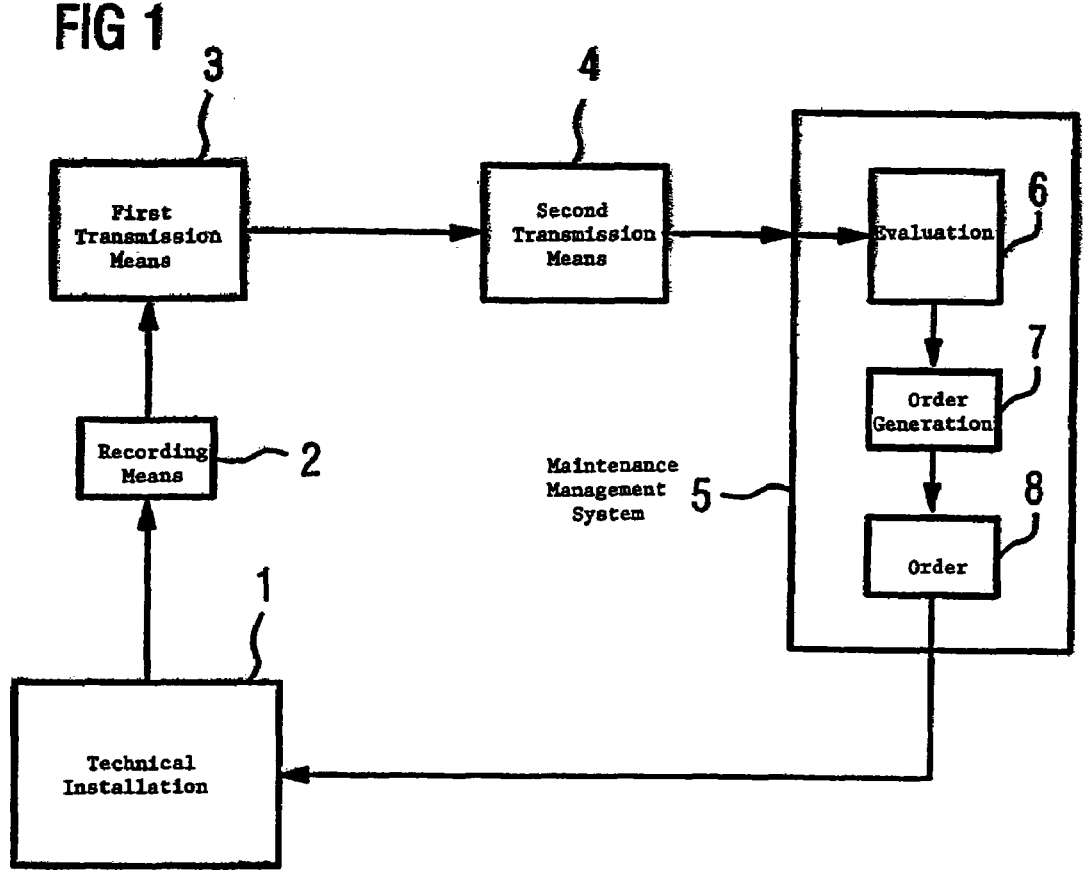
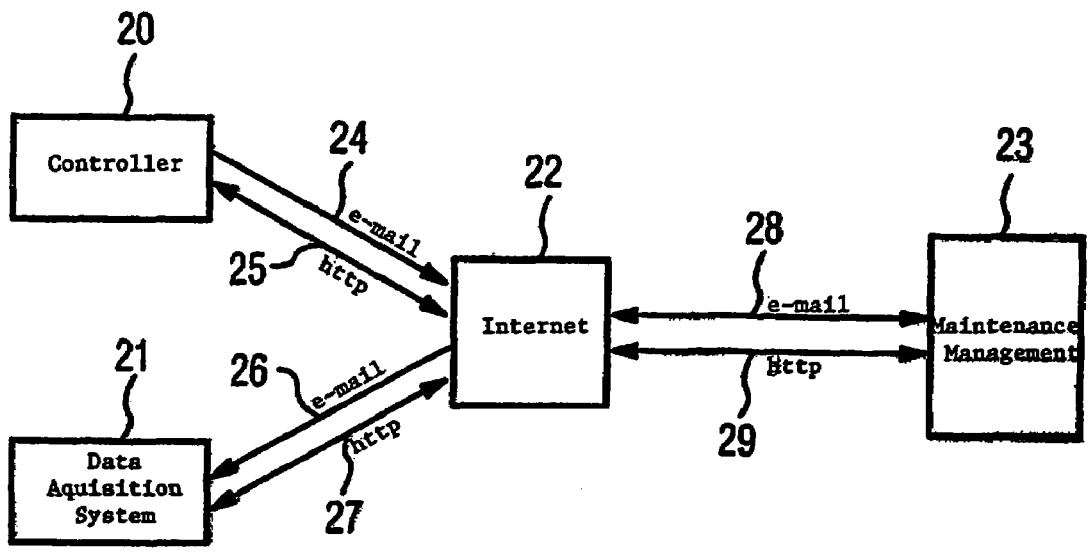

SYSTEM AND METHOD FOR CONDITION-BASED MAINTENANCE

CROSS REFERENCE TO RELATED APPLICATIONS

This application is the U.S. National Stage of International application No. PCT/DE2003/002485, filed Jul. 23, 2003 and claims the benefit thereof. The International Application claims the benefits of German application No. 10235794.3 filed Aug. 5, 2002, both applications are incorporated by reference herein in their entirety.

FIELD OF THE INVENTION

The invention relates to a system and a method for condition-based maintenance of machines, installations and operating means.

BACKGROUND OF THE INVENTION

WO 01/59972 A2 describes a method for the maintenance of components. By means of the method it is determined that a certain component has to be maintained. A maintenance process with at least one maintenance order is automatically selected, in order to perform this maintenance. The maintenance process is administered and monitored on a maintenance server.

From EP 0 822 473 A2, a system for the maintenance of dispersed industrial installations is known. In this case, the industrial installations in dispersed factories are monitored by host computers. Each of these host computers is connected via the Internet to a management host computer at the supplier end. The host computer at the customer end transmits fault messages from the industrial installations to the supplier. The host computer at the supplier end then provides information on possible countermeasures to the host computer at the customer end.

WO 00/62138 describes a method and a system for the performance of maintenance of a production installation, particularly in the paper industry. In this case, information on the production process is provided to a remote service unit, where this information is collected and analyzed. The transmission between the production installation and the service unit takes place via the Internet, with the particular internal data networks being separated from the Internet itself by firewalls.

From U.S. Pat. No. 6,317,701 B1, a maintenance system is known whereby data is transmitted from intelligent field devices to a local maintenance management system. The collected data is transmitted via the Internet to a global maintenance server.

SUMMARY OF THE INVENTION

The object of the invention is to provide a universal solution for condition-based maintenance, particularly of dispersed technical installations.

The object is achieved by a system for condition-based maintenance of at least one decentralized technical installation, with recording means for recording condition values (e.g. states) of the technical installation, with transmission means for transmission of the recorded condition values to a central maintenance management system that has a first means for evaluation of the condition values and a second means for generation of maintenance orders relative to the results of the evaluation of the condition values.

This object is achieved by a method for condition-based maintenance of at least one decentralized technical installation by means of which condition values of the technical installation are recorded by recording means, with the recorded condition values being transmitted to a central maintenance management system by transmission means, whereby the central maintenance management system evaluates the condition values with first means and with second means generates maintenance orders relative to a result of the evaluation of the condition values.

More and more machines, installations and operating means are sold with a maintenance contract. Part of this maintenance is condition-based maintenance, whereby maintenance is not activated until a specific condition is reached. The invention is based on the idea of transmitting the condition data of the installations installed at the customer to a central maintenance management system of the machine manufacturer for evaluation. This system can also similarly be used within a company as part of a central condition-based maintenance. In this case, the condition-based maintenance is set up, monitored, implemented and/or documented by a central organization with the aid of the maintenance management system. To be able to administer a system centrally for condition-based maintenance, the recorded condition values are transmitted to the center. The maintenance orders can then be generated, planned and documented in the maintenance management system in the center.

In accordance with an advantageous embodiment of the invention, a second means of the central maintenance management system is provided to generate maintenance orders corresponding to predefined rules. This enables a particularly fast and effective generation of maintenance orders. The predefined rules in this case are present in the form of permanent links, as a knowledge basis, or also in the form of adaptable expert systems.

For ongoing support of the condition-based maintenance, the central maintenance management system has a third means for the implementation, monitoring and/or documentation of the generated maintenance orders. A maintenance management system set up in this way goes far beyond maintenance servers known according to the prior art.

Advantageously, the transmission means for transmission of the recorded condition values is provided by e-mail. Transmission by e-mail has the advantage that no continuously-open Internet connection is necessary. The e-mail transmission is a tried and tested reliable standard mechanism on the Internet. The transmission and reception processes are decoupled with regard to time without a risk of transmitted condition values being lost.

In accordance with a further advantageous embodiment of the invention, the transmission means for transmission of the recorded condition values is provided by means of http transfer. At the installation end the recorded condition values are thus stored in a suitably configured Internet page that can then be called up by the central maintenance management system at any time or at previously defined times.

Advantageously, the recording means is part of a stored program control system or a SCADA system.

In a further advantageous embodiment of the invention, the maintenance management system is linked to an industrial framework system or connected into such a system.

The invention is explained in more detail in the following with the aid of illustrations showing examples of embodiment.

BRIEF DESCRIPTION OF THE DRAWINGS

These are as follows:

FIG. 1 A system for condition-based maintenance of a decentralized technical installation FIG. 2 A principle representation of such a system using various means of transmission of the recorded condition values FIG. 3 The transmission of the recorded condition values by means of e-mail communication FIG. 4 The transmission of the recorded condition values by means of http communication.

DETAILED DESCRIPTION OF THE INVENTION

Figure 3:
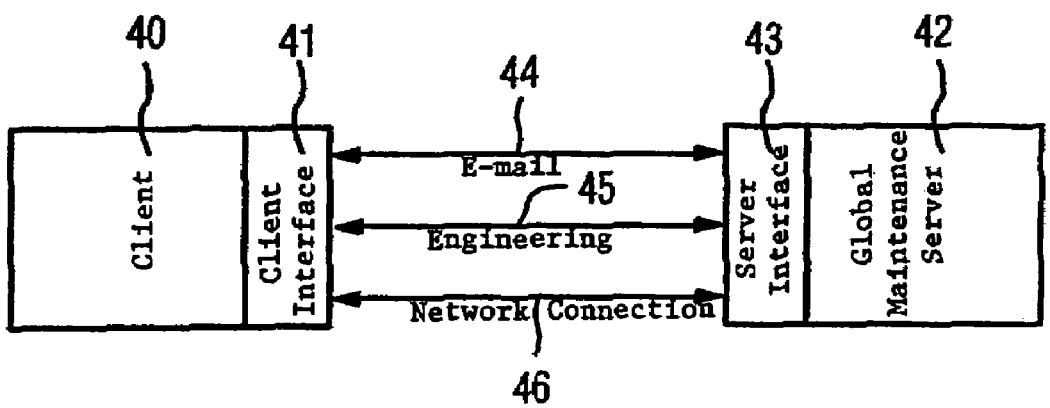

FIG. 1 shows a system for condition-based maintenance of a decentralized technical installation 1. By means of the recording means 2, condition values (tag values) of the technical installation 1 are recorded that are transmitted by a transmission means 3,4 to a central maintenance management system 5. The maintenance management system 5 contains a first means 6 for evaluation of the condition values and a second means 7 for generation of maintenance orders 8 relative to a result of the evaluation of the condition values. The evaluation of the condition values consists, for example, of an evaluation to determine whether the particular condition value is within specified limiting values. The second means 7 can, for example, be provided for generation of maintenance orders 8 corresponding to predefined rules. A maintenance order 8 of this kind determines and describes, e.g. what maintenance activities are to be performed (e.g. oil change), what resources (materials, personnel, tools, etc.) are required and what time limits are to be maintained, etc.

FIG. 2 shows a general arrangement of a system for condition-based maintenance of at least one decentralized technical installation with various transmission means being used to transmit the recorded condition values. In the example of an embodiment, a decentralized technical installation is controlled by a stored program controller (e.g. a programmable logic controller or PLC) 20 (SPC) or by a SCADA (Supervisory Control and Data Acquisition System) 21. Various process parameters are available in the SPC or SCADA system. Part of these process parameters (e.g. operating hours, switching cycles, pressure, temperature, etc.) can describe the condition of the decentralized technical installation or the condition of the parts of the installation relative to the maintenance measures required. These process parameters are transmitted to a central maintenance management system 23 for maintenance evaluation in a center, at specific intervals or according to previously defined events. As part of a cost-effective and standardized total solution, the transmission of the condition values takes place via the Internet 22 by means of e-mail communication 24,26,28 or by means of http communication 25,27,29. The condition values are imported directly into the maintenance management system 23 and evaluated by same, i.e. the maintenance management system 23 generates maintenance orders or triggers maintenance alarms. The described global maintenance scenario represents a universal solution from data recording using automated technology up to evaluation in the maintenance management system 23 and the associated data transmission.

FIG. 3 shows the transmission of the recorded condition values by means of e-mail communication. A personal computer (PC) in the decentralized technical installation to be maintained at the customer end, a so-called maintenance client 40 has an interface 41, e.g. a modem, LAN or Internet access. The maintenance client 40 at the customer end transmits maintenance data and alarms to the global central maintenance server 42. Furthermore, the maintenance client 40 enables online importing directly from the SPC, by means of an OPC server (OLE for Process Control Server), offline importing using manual input into a web GUI (Graphical User Interface) and web access to a local, installation-specific maintenance management system. At the supplier end, a maintenance server 42 realizes the functions of the maintenance management system. The maintenance server 42 also has an interface 43. Communication between the maintenance client 40 and maintenance server 42 takes place via the Internet or through a Local Area Network (LAN). By means of an e-mail connection 44, the maintenance client 40 supplies XML tags to the maintenance server 42. A LAN or Internet connection enables online/remote engineering 45 (application sharing) of the maintenance client 40 at the customer end. The maintenance client 40 can access the maintenance server 42 via a LAN/Internet connection 46.

Figure 4:
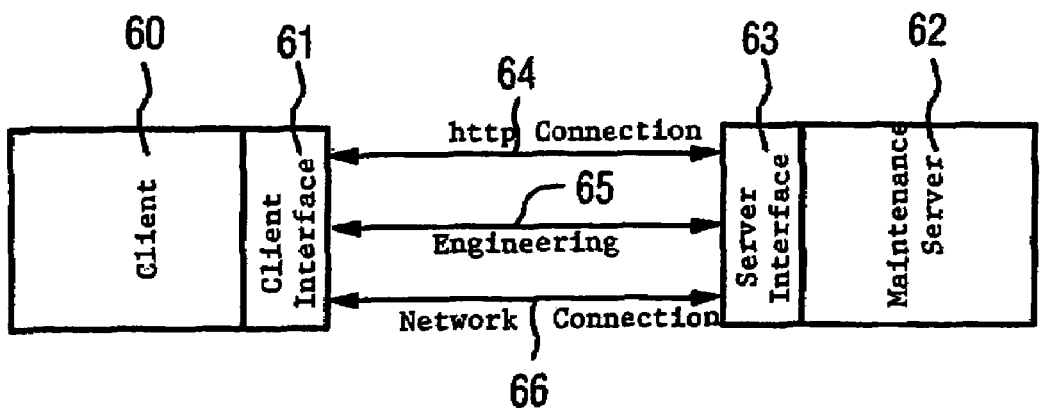

FIG. 4 shows the transmission of the recorded condition values by means of http communication. A personal computer (PC) in the decentralized technical installation to be maintained at the customer end, a so-called maintenance client 60 has an interface 61, e.g. a modem, LAN or Internet access. At the supplier end, a maintenance server 62 realizes the functions of the maintenance management system. The maintenance server 62 also has an interface 63. Communication between the maintenance client 60 and maintenance server 62 takes place via the Internet or through a Local Area Network (LAN). By means of an http connection 64, the maintenance server 62 can request XML tags from the maintenance client 60. A LAN or Internet connection enables online engineering 65 (application sharing). The maintenance client 60 can access the maintenance server 62 via a LAN/Internet connection 66.

To sum up, the invention thus relates to a system and a method for condition-based maintenance of at least one decentralized technical installation 1 or of machines and operating means of such an installation 1. The system includes recording means 2 for recording condition values of the technical installation 1 and transmission means 3,4 for the transmission of the recorded condition values to a central maintenance management system 5, that has a first means 6 for evaluation of the condition values and a second means 7 for generation of maintenance orders 8 relative to a result of the evaluation of the condition values. The condition-based maintenance Condition Based Maintenance takes place particularly by means of a global maintenance system 5 by transmission of condition values from an automated system (e.g. SPC, SCADA) via e-mail or http transfer.

The invention claimed is:

1. A system for condition-based maintenance of at least one decentralized technical installation, the system comprising:
   a mechanism for recording condition values of the technical installation; and
   a mechanism for transmitting the recorded condition values to a central maintenance management system, the central maintenance management system comprising a first mechanism for evaluation of the condition values and a second mechanism for generating maintenance orders according to the result of the evaluation of the condition values, wherein the mechanism for transmitting the recorded condition values is adapted for transmitting the recorded condition values to the central maintenance management system using e-mail.

2. The system in accordance with claim 1, wherein the second mechanism of the central maintenance management system generates the maintenance orders according to pre-defined rules.

3. The system in accordance with claim 2, wherein the central maintenance management system comprises a third mechanism for implementation, monitoring and/or documentation of the generated maintenance order.

4. The system in accordance with claim 2, wherein the mechanism for transmitting is using a http protocol.

5. The system in accordance with claim 2, wherein the mechanism for recording is integrated into a logical program controller or a SCADA system.

6. The system in accordance with claim 2, wherein the maintenance management system is connected to an industrial framework system.

7. The system in accordance with claim 1, wherein the central maintenance management system comprises a third mechanism for implementation, monitoring and/or documentation of the generated maintenance order.

8. The system in accordance with claim 7, wherein the mechanism for transmitting is provided for the transmission of the recorded condition values by means of http transfer.

9. The system in accordance with claim 7, wherein the mechanism for recording is part of a stored program controller or a SCADA system.

10. The system in accordance with claim 7, wherein the maintenance management system is linked to an industrial framework system.

11. The system in accordance with claim 1, wherein the mechanism for transmitting is adapted for using a http transfer.

12. The system in accordance with claim 11, wherein the mechanism for recording is part of a stored program controller or a SCADA system.

13. The system in accordance with claim 11, wherein the maintenance management system is connected to an industrial framework system.

14. The system in accordance with claim 1, wherein the mechanism for recording is part of a stored program controller or a SCADA system.

15. The system in accordance with claim 14, wherein the maintenance management system is connected to an industrial framework system.

16. The system in accordance with claim 1, wherein the maintenance management system is connected to an industrial framework system.

17. A method for condition-based maintenance of at least one decentralized technical installation, comprising:
 recording condition values of the technical installation by a recording mechanism;
 transmitting by a transmission mechanism using email the recorded condition values to a central maintenance management system for automated evaluation;
 evaluating the condition values by the central maintenance management system; and
 creating maintenance orders by the central maintenance management system relative to the result of the evaluation of the condition values.

18. The method in accordance with claim 17, wherein the maintenance management system uses a first mechanism for evaluating the condition values and a second mechanism for creating the maintenance orders.

* * * * *